Aug. 24, 1954     S. VORECH     2,687,046
LOCK FOR BRAKE SLACK ADJUSTERS
Filed April 19, 1950
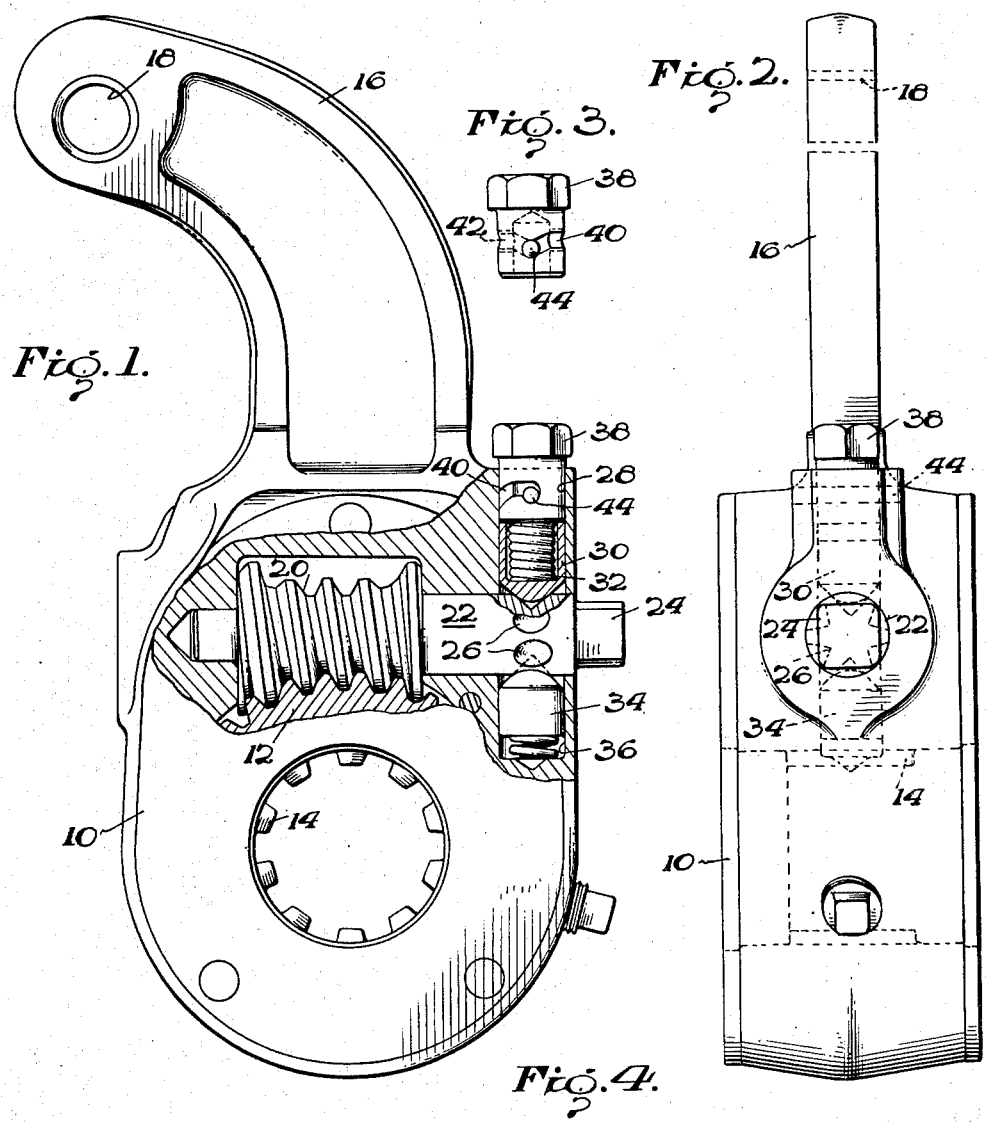
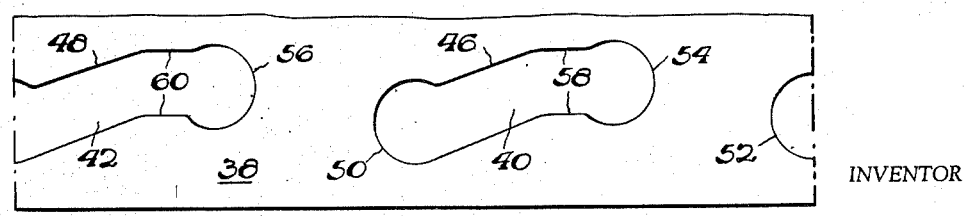
INVENTOR
Stephen Vorech.
BY Scrivener & Parker
ATTORNEYS Patented Aug. 24, 1954

2,687,046

UNITED STATES PATENT OFFICE 2,687,046

LOCK FOR BRAKE SLACK ADJUSTERS

Stephen Vorech, Elyria, Ohio, assignor to Bendix-Westinghouse Automotive Air Brake Company, Elyria, Ohio, a corporation of Delaware Application April 19, 1950, Serial No. 156,819

7 Claims. (Cl. 74—527)

This invention relates to slack adjusters for vehicle brakes and more particularly to a locking mechanism therefor which functions to positively lock the slack adjuster in any desired position of adjustment and thereby prevents any change in the adjustment during operation of the vehicle brakes.

One of the objects of the present invention is to provide a slack adjuster construction for vehicle brakes including a novel arrangement which permits a quick adjustment of the parts while insuring a positive locking thereof in the desired position of adjustment.

Another object is to provide a novel detent construction for a brake slack adjuster device, which is so constituted as to be capable of quick adjustment to either one position permitting adjusting movements of the device, or to another position to positively lock the parts in adjusted position.

A further object is to provide a novel construction of the above character which includes a relatively simple arrangement of parts, capable of economical manufacture, and effectively operable throughout long periods of use.

Other objects and novel features of the invention will appear more fully hereinafter from the following detailed description when taken in connection with the accompanying drawing illustrating one form of the invention. It is to be expressly understood however that the drawing is utilized for purposes of illustration only and is not designed as a definition of the limits of the invention, reference being had for this purpose to the appended claims.

In the drawing, wherein similar reference characters refer to similar parts throughout the several views, Fig. 1 is a front view partly in section, of a slack adjuster and locking means therefor constructed in accordance with the principles of the present invention;

Fig. 2 is a side view of the slack adjuster shown in Fig. 1;

Fig. 3 is a side view of the detent locking member; and

Fig. 4 is an enlarged developed view of the detent locking member illustrating the diametrically opposed cam slots therein.

The present invention is directed to a slack adjuster of a conventional type, the same comprising a casing provided with a worm wheel mounted on the brake cam shaft, together with a worm engaging the worm wheel for adjusting the position of the latter with respect to the casing in order to adjust the vehicle brakes. Many types of detent and locking devices have been heretofore provided for maintaining the worm in a desired position of adjustment. In the present invention, a positive locking detent of novel construction is employed so that the worm shaft adjustment may be quickly and easily effected and the slack adjuster thereafter securely locked in an adjusted position without danger of backing off, notwithstanding the development of high braking torques to which the slack adjuster is subjected.

Referring more particularly to Fig. 1, a slack adjuster of the foregoing type is illustrated therein as comprising a body 10 having a worm wheel 12 rotatably mounted therein and provided with a series of internal splines 14 for connection with a brake operating cam shaft, not shown. As illustrated, the body 10 is provided with an outwardly extending portion constituting a brake lever 16, the outer end of which has an opening 18 for receiving the end of a suitable brake operating rod. A worm 20 secured to a worm shaft 22 rotatably mounted in any suitable manner within the body 10, is positioned to mesh with the worm wheel 12, and preferably the outer end of the shaft 22 is provided with a convenient wrench-engaging head 24 in order that the shaft 22 may be rotated to thereby adjust the position of the worm wheel 12 and the brake operating cam shaft with respect to the casing. It will be readily understood that upon rotation of the worm shaft 22, the worm wheel 12 will be moved in a proper direction so that the position of the brake actuating cam shaft with respect to the brake actuating rod 16 may be adjusted. In this manner, any slack or clearance in the brake may be taken up or otherwise adjusted to its proper value.

The main feature of the present invention resides in a novel construction for positively locking the worm shaft 22 and the worm 20 in any desired position of adjustment, the arrangement being such that the locking of the shaft and the unlocking thereof, may be quickly effected and in a relatively simple manner. As shown, such construction includes a plurality of spaced apart notches 26 which are circumferentially arranged on the shaft 22. Casing 10 is provided with a bore 28 extending laterally of the shaft 22 for slidably receiving a detent member 30 having one end thereof selectively engageable with a selected one of the notches 26. Resilient means such as a coil spring 32 yieldably urges the detent member 30 to its shaft engaging position. If desired, a second yieldable detent 34 may be positioned within a bore 36, diametrically opposed to the bore 28 in order to provide a further detent action during adjustment of shaft 22.

One of the important features of the present invention resides in the use of a locking member for controlling the action of the detent 30 and the spring 32. Such locking member, illustrated at 38 is so arranged as to be capable of limited rotation in opposite directions with respect to the bore 28. During such rotative movements, the present invention provides an arrangement whereby the locking member 38 may be either moved toward the shaft 22 or moved in a direction away from said shaft. During movement of the locking member 38 toward the shaft 22, the construction is such that the said member engages the upper end of the detent member 30 in order to effectively lock the same in the position illustrated. Thus, with the parts as shown, rotation of the shaft 22 in either direction is positively prevented. On the other hand, when the locking member 38 is moved outwardly with respect to the shaft 22, the spring 32 elongates and serves to yieldably maintain the shaft 22 in any desired position. Under these conditions, the said shaft may be readily rotated in the proper direction to effect the desired adjustment of the brakes. Thereafter it is only necessary to move the locking member 38 to the first mentioned position in order that the adjustment may be effectively maintained in a locked position.

In order to provide the foregoing desirable results, the locking member 38 is provided with a pair of diametrically opposed similar cam slots 40 and 42 which cooperate with a pin 44 having its opposite ends secured to the wall of the bore 28. As will be seen from Fig. 4, the slots 40 and 42 are provided with the respective inclined portions 46 and 48 so that upon rotation of the locking member 38 in one direction, the cooperation between the inclined portions of the slots 40 and 42 and the pin 44, will move the member 38 axially in the bore 28 so that the locking member is moved in one direction axially. For example, such movement may bring enlarged portions 50 and 52 of the slots in such a position as to embrace the opposite ends of the pin 44. In this position of the parts, the member 38 is moved away from the detent 30, the load on the spring 32 is relieved, and the detent 30 hence functions as a yieldable detent.

On the other hand, in the event the locking member 38 is moved in the opposite direction toward the shaft 22, enlarged end portions 54 and 56 of the slots will be brought into engagement with the opposite ends of the pin 44. Under these conditions, the locking member 38 will engage the upper end of the detent 30 and the shaft 22 will thereupon be effectively locked in its then position of adjustment.

It will be noted from Figs. 1 to 4 that the enlarged portions 54 and 56 of the slots are connected to the inclined portions 46 and 48 through portions 58 and 60 which are arranged substantially normal to the axis of the locking member 38. From this construction, and considering also that the portions 54 and 56 of the slots are enlarged, it will be readily seen that the locking action on the detent 30, when the parts occupy the position shown in Fig. 1, is positive. Thus there will be no tendency toward rotation of the locking member 38 toward a non-locking position notwithstanding the application of heavy torques to the slack adjuster.

From the foregoing, it is believed that the operation of the invention will be readily apparent. For example, Fig. 1 illustrates the position of the parts where the locking member 38 occupies its locked position and is engaged with the detent 30. On the other hand, if it is desired to adjust the shaft 22, it is only necessary to rotate the member 38 to the position illustrated in Fig. 3. Under these conditions, the member 38 will be moved outwardly with respect to the bore 28 and the detent 30, by reason of the cooperation between the slots 40 and 42 and the pin 44, and the compression of the spring 32 will be relieved in order that the latter may elongate. Shaft 22 may then be adjusted in the usual manner and yieldingly maintained in the adjusted position by the detents 30 and 34 until the locking member 38 is returned to the locking position shown in Fig. 1.

It will be appreciated from the foregoing that the invention provides a novel and efficient locking arrangement for a brake slack adjuster which is capable of positively locking the parts in any desired position of adjustment. This feature eliminates the possibility of any backing off of the adjuster when subjected to high braking torques. An important advantage of the invention resides in the ease with which the adjustments may be made, it being pointed out that a partial turn of the locking member 38 in one direction secures an effective locking action while a partial turn of the member in the other direction releases the locking action and enables the detent to operate as a yielding member. While the positive locking action is secured through engagement between the locking member 38 and the detent 30, it is pointed out that when this action occurs, the spring is compressed to a substantially solid state. Hence, if desired, the locking action may be secured by the solid state of the spring 32, in which event it would be unnecessary that the member 38 engage the detent 30.

While one embodiment of the invention has been illustrated and described herein, it will be readily understood by those skilled in the art that various changes and modifications may be resorted to without departing from the spirit of the invention. Reference will therefore be had to the appended claims for a definition of the limits of the invention.

What is claimed is:

1. In a brake slack adjuster of the type having a body provided with a brake lever, a worm wheel rotatably mounted in the body, a worm engaging the worm wheel and provided with a shaft rotatably mounted in the body, and means to rotate the shaft and worm to adjust the worm wheel relative to the body, the improvement which comprises a detent member carried by the body, a plurality of notches formed on said shaft and with which one end of said member cooperates to releasably maintain said shaft in a selected position of rotatable adjustment, resilient means for yieldably urging said member into one of said notches to engage said shaft, and means separate from said member and carried by the body and movable therein to compress the resilient means and to engage the opposite end of said member to positively lock the latter to prevent movement thereof with respect to said shaft and body and thereby prevent rotation of said shaft.

2. In a brake slack adjuster of the type having a body provided with a brake lever, a worm wheel rotatably mounted in the body, a worm engaging the worm wheel and provided with a shaft rotatably mounted in the body, and means to rotate the shaft and worm to adjust the worm wheel relative to the body, the improvement which comprises a detent member carried by the body having one end thereof selectively engageable with one of a plurality of notches formed on said shaft, a resilient element having one end thereof engaging said detent member for resiliently moving the latter into one of said notches to engage said shaft, and means carried by the body and separate from said member for maintaining said member in engagement with said shaft to positively lock the shaft in a desired position of adjustment, comprising a rotatable device provided with a cam slot, said device being rotatable in said body independently of said member, and a part carried by the body projecting into said slot.

3. The combination as set forth in claim 2 wherein the cam slot is provided with an enlarged end portion.

4. In a brake slack adjuster of the type having a body provided with a brake lever, a worm wheel rotatably mounted in the body, a worm engaging the worm wheel and provided with a shaft rotatably mounted in the body, and means to rotate the shaft and worm to adjust the worm wheel relative to the body, the improvement which comprises a detent member mounted in a bore in the body and having one end thereof selectively engageable with one of a plurality of notches formed on said shaft, a resilient element mounted in said bore and having one end thereof engaging said detent member for yieldably urging the latter to a shaft-engaging position, and separate from said member and means carried by the body for maintaining said member in said shaft-engaging position to positively lock the shaft in a desired position of adjustment, comprising a rotatable device mounted in said bore and engaging the opposite end of said resilient element, said device provided with a cam slot, and a pin carried by the body and positioned in the slot so that rotation of said device will move the latter longitudinally in the bore to compress the spring and engage the opposite end of the detent to positively lock the shaft in its then position of adjustment.

5. The combination as set forth in claim 4 wherein the cam slot is provided with an enlarged end portion.

6. A lock for a brake slack adjuster having a worm shaft rotatably supported in a body and provided with a plurality of spaced-apart circumferentially arranged notches, which comprises a detent carried by the body and having one end thereof selectively engageable with one of said notches, said detent being provided with a recess extending inwardly from its other end, a coiled spring mounted in said recess for yieldably urging the detent to a shaft-engaging position, a locking member separate from the detent and engaging the free end of said spring and mounted in said body for partial rotation in opposite directions, and means to move said locking member axially in opposite directions to respectively compress said spring and engage the other end of the detent to positively lock the shaft in an adjusted shaft-engaged position or to allow said spring to expand and thereby yieldably maintain the detent in engagement with said shaft, comprising a pin carried by the body and extending through a pair of diametrically opposed cam slots formed in said locking member.

7. A lock for a brake slack adjuster as set forth in claim 6 wherein the cam slots are provided with enlarged portions at opposite ends thereof.

References Cited in the file of this patent

UNITED STATES PATENTS

| Number | Name | Date |
|---|---|---|
| 1,078,107 | Nygren | Nov. 11, 1913 |
| 1,689,235 | Fowler et al. | Oct. 30, 1928 |
| 2,072,877 | Green | Mar. 9, 1937 |
| 2,185,814 | Kuhn | Jan. 2, 1940 |
| 2,226,662 | Humphrey | Dec. 31, 1940 |
| 2,294,974 | Freeman | Sept. 8, 1942 |
| 2,347,186 | Freeman | Apr. 25, 1944 |
| 2,348,292 | Gross | May 9, 1944 |
| 2,348,734 | Freeman | May 16, 1944 |
| 2,377,014 | Keller | May 29, 1940 |
| 2,427,310 | Shumaker | Sept. 9, 1947 |
| 2,476,195 | Horman | July 12, 1949 |